(12) United States Patent
Kawasaki

(10) Patent No.: US 10,374,273 B2
(45) Date of Patent: Aug. 6, 2019

(54) CONNECTOR DEVICE, COMMUNICATION DEVICE, AND COMMUNICATION SYSTEM

(71) Applicant: SONY SEMICONDUCTOR SOLUTIONS CORPORATION, Kanagawa (JP)

(72) Inventor: Kenichi Kawasaki, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 26 days.

(21) Appl. No.: 15/549,335

(22) PCT Filed: Dec. 10, 2015

(86) PCT No.: PCT/JP2015/084631
§ 371 (c)(1),
(2) Date: Aug. 7, 2017

(87) PCT Pub. No.: WO2016/136091
PCT Pub. Date: Sep. 1, 2016

(65) Prior Publication Data
US 2018/0025882 A1    Jan. 25, 2018

(30) Foreign Application Priority Data

Feb. 27, 2015 (JP) .................................. 2015-038619

(51) Int. Cl.
*H01P 1/04* (2006.01)
*H04B 1/04* (2006.01)
(Continued)

(52) U.S. Cl.
CPC .............. *H01P 1/042* (2013.01); *H01J 23/54* (2013.01); *H01P 1/04* (2013.01); *H01P 5/04* (2013.01);
(Continued)

(58) Field of Classification Search
CPC .... H01J 23/54; H01P 5/04; H01P 1/04; H01P 5/022; H01P 1/042; H04B 1/04; H04B 5/0031
(Continued)

(56) References Cited

U.S. PATENT DOCUMENTS

2008/0001686 A1 * 1/2008 Chao ....................... H01P 1/042
333/254

FOREIGN PATENT DOCUMENTS

| JP | 03-238901 A | 10/1991 |
| JP | 04-288729 A | 10/1992 |

(Continued)

OTHER PUBLICATIONS

Machine English Translation of JPH03238901A Published on Oct. 24, 1991 (Year: 1991).*

(Continued)

*Primary Examiner* — Rakesh B Patel
*Assistant Examiner* — Jorge L Salazar, Jr.
(74) *Attorney, Agent, or Firm* — Chip Law Group

(57) ABSTRACT

A connector device of the present disclosure includes two waveguides configured to transmit a radio-frequency signal, a state monitoring unit configured to monitor a connection state of the two waveguides, and a control unit that is provided on a side of the waveguide, which is on a transmission side to transmit a radio-frequency signal, between the two waveguides and that stops transmission of the radio-frequency signal according to the connection state of the two waveguides, the state being monitored by the state monitoring unit.

15 Claims, 8 Drawing Sheets

(51) Int. Cl.
*H01J 23/54* (2006.01)
*H01P 5/04* (2006.01)
H01P 5/02 (2006.01)
H04B 5/00 (2006.01)

(52) U.S. Cl.
CPC ............ *H04B 1/04* (2013.01); *H01P 5/022* (2013.01); *H04B 5/0031* (2013.01)

(58) Field of Classification Search
USPC .............................. 333/24 R, 202, 208, 24 C
See application file for complete search history.

(56) References Cited

FOREIGN PATENT DOCUMENTS

| | | |
|---|---|---|
| JP | 07-135196 A | 5/1995 |
| JP | 2006-065700 A | 3/2006 |

OTHER PUBLICATIONS

International Search Report and Written Opinion of PCT Application No. PCT/JP2015/084631, dated Feb. 9, 2016, 01 pages of English Translation and 07 pages of ISRWO.

\* cited by examiner

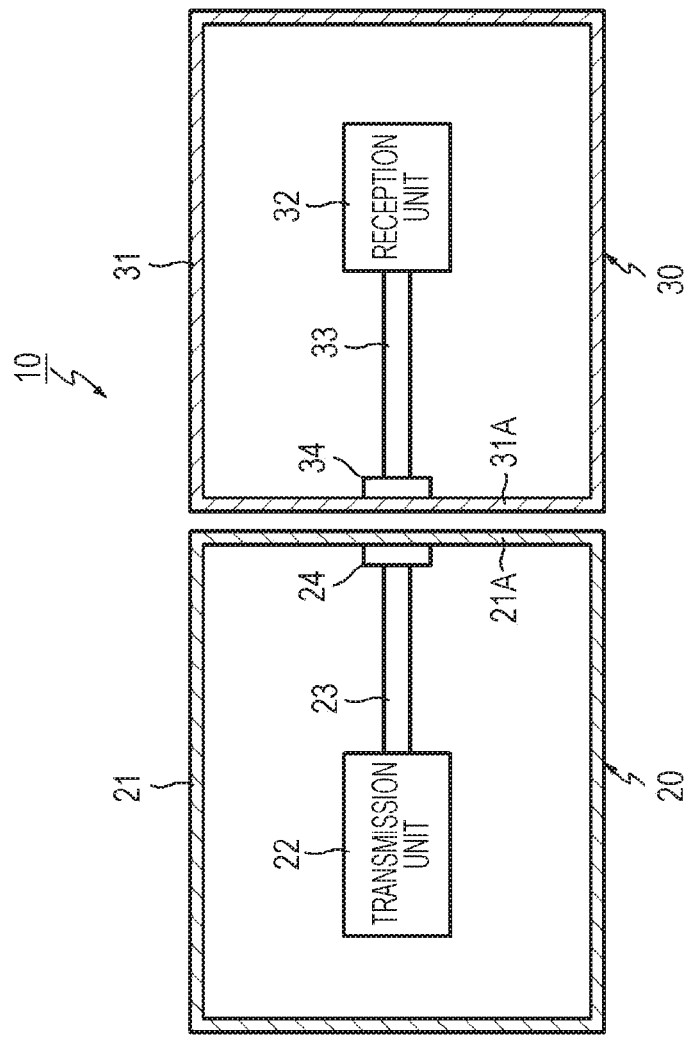

CONNECTOR DEVICE, COMMUNICATION DEVICE, AND COMMUNICATION SYSTEM

CROSS REFERENCE TO RELATED APPLICATIONS

This application is a U.S. National Phase of International Patent Application No. PCT/JP2015/084631 filed on Dec. 10, 2015, which claims priority benefit of Japanese Patent Application No. JP 2015-038619 filed in the Japan Patent Office on Feb. 27, 2015. Each of the above-referenced applications is hereby incorporated herein by reference in its entirety.

TECHNICAL FIELD

The present disclosure relates to a connector device, a communication device, and a communication system.

BACKGROUND ART

There is a communication system in which communication is performed between two communication devices in a state in which housings (main body of device) are in contact with or adjacent to each other. As an example of this kind of communication system, there is a communication system in which one of two communication devices is a mobile terminal device and the other is a radio communication device called a cradle (see, for example, Patent Document 1).

CITATION LIST

Patent Document

Patent Document 1: Japanese Patent Application Laid-Open No. 2006-65700

SUMMARY OF THE INVENTION

Problems to be Solved by the Invention

In a communication system in which communication is performed between different communication devices in a state in which housings (main body of device) are in contact with or adjacent to each other, it is important that no radio wave is leaked to the outside of the housings in terms of a transmission characteristic, interference with a different device, and the like. However, in the communication system according to the conventional example, there is a problem that a transmission characteristic is deteriorated since radio communication using a slot antenna is used and a radio wave is likely to be leaked to the outside of the housings. This point (problem) is obvious from the fact that leakage of a radio wave is prevented by arrangement of a radio wave absorber around a housing in a third embodiment in Patent Document 1.

The present disclosure is to provide a connector device, a communication device, and a communication system that can control deterioration of a transmission characteristic due to leakage of a radio wave to the outside of housings in communication between two communication devices in a state in which the housings are in contact with or adjacent to each other.

Solutions to Problems

A connector device of the present disclosure to achieve the above object is a connector device including: two waveguides configured to transmit a radio-frequency signal; a state monitoring unit configured to monitor a connection state of the two waveguides; and a control unit that is provided on a side of the waveguide, which is on a transmission side to transmit a radio-frequency signal, between the two waveguides and that stops transmission of the radio-frequency signal according to the connection state of the two waveguides, the state being monitored by the state monitoring unit.

A communication device of the present disclosure to achieve the above object is a communication device including: a connector device configured to transmit a radio-frequency signal to a different communication device including a waveguide, in which the connector device includes a waveguide configured to transmit a radio-frequency signal to the waveguide of the different communication device, a state monitoring unit configured to monitor a connection state of the two waveguides between itself and the different communication device, and a control unit configured to stop transmission of the radio-frequency signal according to the connection state of the two waveguides, the state being monitored by the state monitoring unit.

A communication system of the present disclosure to achieve the above object is a communication system including: two communication devices; and a connector device configured to transmit a radio-frequency signal between the two communication devices, in which the connector device includes two waveguides respectively provided in the two communication devices, a state monitoring unit configured to monitor a connection state of the two waveguides, and a control unit that is provided on a side of the waveguide, which is on a transmission side to transmit a radio-frequency signal, between the two waveguides and that stops transmission of the radio-frequency signal according to the connection state of the two waveguides, the state being monitored by the state monitoring unit.

In the connector device, communication device, or communication system having the above configuration, a connection state of the two waveguides is monitored, and transmission of a radio-frequency signal is stopped in a case where the connection state is, for example, a state in which radio wave leakage is generated at a connection part. By stopping the transmission of the radio-frequency signal, it is possible to control leakage of a radio wave to the outside between the two communication devices even if the connection state of the two waveguides is a state in which radio wave leakage is generated at the connection part thereof.

Effects of the Invention

According to the present disclosure, it is possible to control deterioration of a transmission characteristic due to leakage of a radio wave since leakage of a radio wave to the outside can be controlled.

Note that an effect described herein is not the limitation and may be any of the effects described in the present specification. Also, the effects described in the present specification are just examples and not the limitation. Also, there may be an additional effect.

BRIEF DESCRIPTION OF DRAWINGS

FIG. 1 is a plan view partially including a cross section and illustrating a basic configuration of a communication system according to an embodiment of the present disclosure.

MODE FOR CARRYING OUT THE INVENTION

Figure 2A:
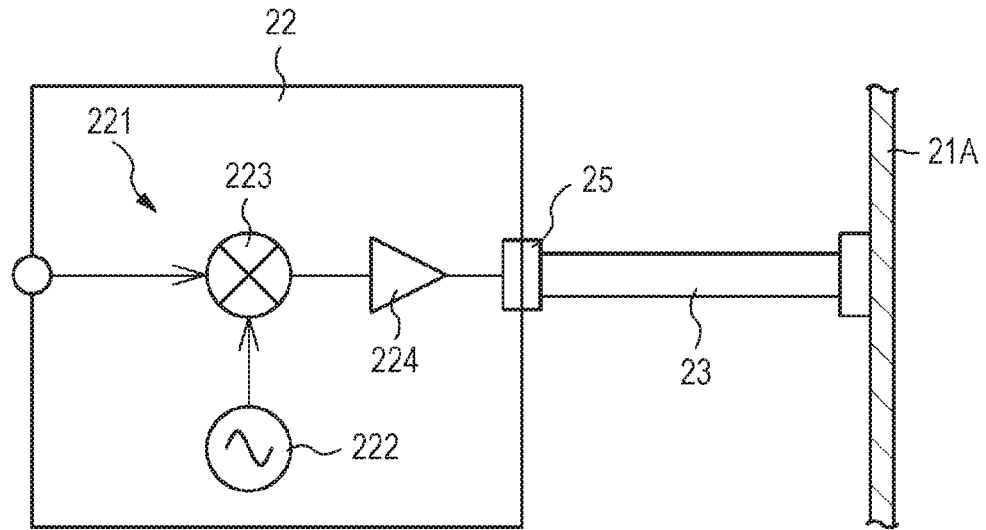
FIG. 2A is a block diagram illustrating an example of a detailed configuration of a transmission unit.

In the following, modes to carryout a technology of the present disclosure (hereinafter, referred to as "embodiment") will be described in detail with reference to the drawings. The technology of the present disclosure is not limited to the embodiments, and various numerical values, and the like in the embodiments are examples. In the following description, the same reference signs are used for the same elements or for elements having the same function, and redundant description is omitted. Note that the description will be made in the following order.

1. Description of connector device, communication device, and communication system of present disclosure in general 2. Communication system to which technology of present disclosure is applied 2-1. Basic configuration of communication system 2-2. Detailed configuration of transmission unit and reception unit 2-3. Detailed configuration of leakage prevention structure 3. First Embodiment 3-1. First example (in case where state monitoring unit include leakage detector)

3-2. Second example (in case where state monitoring unit include distance detector)

4. Second Embodiment

<Description of Connector Device, Communication Device, and Communication System of Present Disclosure in General>

In the connector device, the communication device, and the communication system of the present disclosure, a state monitoring unit is provided on a waveguide side on a transmission side. Also, the state monitoring unit monitors whether a connection state of two waveguides is a state in which radio wave leakage is generated at a connection part thereof.

In the connector device, the communication device, and the communication system of the present disclosure having the above-described preferable configuration, a leakage prevention structure to prevent leakage of a radio wave from a connection part is provided at least on a waveguide side on a transmission side in a case where a connection state of two waveguides is a state in which opening ends of the two waveguides are in contact with or adjacent to each other. Here, the leakage prevention structure may be a configuration having a choke structure provided at least in a peripheral part of the opening end of the waveguide on the transmission side. The depth of a groove of the choke structure is preferably ¼ of a wavelength of a radio frequency transmitted between the two waveguides. The choke structure may be provided in a peripheral part of the opening end of the waveguide on the reception side.

Moreover, in the connector device, the communication device, and the communication system of the present disclosure having the above-described preferable configuration, a state monitoring unit may include a leakage detector that detects leakage of a radio wave from a correlation between a signal of a radio wave leaked at a connection part of two waveguides and a signal transmitted between the two waveguides. Alternatively, a state monitoring unit may include a distance detector that detects that a distance between two waveguides exceeds a predetermined distance.

Furthermore, in the connector device, the communication device, and the communication system of the present disclosure having the above-described preferable configuration, a state monitoring unit may be provided on a waveguide side on a reception side to receive a radio-frequency signal and may transmit a return control signal corresponding to a monitoring result to a control unit on a transmission side. Also, the return control signal may be a radio-frequency signal.

Furthermore, in the connector device, the communication device, and the communication system of the present disclosure having the above-described preferable configuration, a radio-frequency signal may be a signal in a millimeter waveband. There are following advantages since a form of communication is communication using a signal in a millimeter waveband as a radio-frequency signal, that is, so-called millimeter wave communication.

a) Since a communication band is wide in millimeter wave communication, it is easy to increase a data rate.

b) A frequency used for transmission can be separated from a frequency of different baseband signal processing and interference between frequencies of a millimeter wave and a baseband signal hardly occurs.

c) Since a wavelength in a millimeter waveband is short, a coupling structure and a waveguide structure determined according to a wavelength can be made small. In addition, since there is strong distance attenuation and a little diffraction, electromagnetic shielding is easily performed.

d) In normal radio communication, there is a strict regulation in stability of a carrier wave in order to prevent interference and the like. In order to realize such a highly-stable carrier wave, an external frequency reference component with high stability, a multiplier circuit or a phase locked loop circuit (PLL), and the like are used and a circuit size becomes large. On the other hand, in millimeter wave communication, it is possible to easily prevent leakage to the outside. Also, since a radio wave is not leaked to the outside, it is possible to use a carrier with low stability for transmission and to control an increase in a circuit size.

<Communication System to which Technology of Present Disclosure is Applied>

[Basic Configuration of Communication System]

FIG. 1 is a plan view partially including a cross section and illustrating a basic configuration of a communication system to which the technology of the present disclosure is applied. In a communication system 10 according to the present application example, communication is performed between different communication devices, more specifically, between a first communication device 20 and a second communication device 30 through a plurality of transmission paths in a state in which housings (main body of device) are in contact with or adjacent to each other.

The first communication device 20 has a configuration in which a transmission unit 22 and a waveguide 23 are housed inside a housing 21. Similarly, the second communication device 30 also has a configuration in which a reception unit 32 and a waveguide 33 are housed inside a housing 31. Each of the housing 21 of the first communication device 20 and the housing 31 of the second communication device 30 has, for example, a rectangular shape and is made of a dielectric material such as a resin having a dielectric constant of 3 and a thickness of about 0.2 [mm]. That is, the housing 21 of the first communication device 20 and the housing 31 of the second communication device 30 are resinous housings.

In the communication system 10 including the first communication device 20 and the second communication device 30, communication is preferably performed between the communication devices 20 and 30 by utilization of a radio-frequency signal such as a signal in a millimeter waveband in a state in which planes of the housing 21 and the housing 31 are in contact with or adjacent to each other. Here, since a radio-frequency signal is a signal in the millimeter waveband, "being adjacent" only needs to be in such a manner that a transmission range of the signal in the millimeter waveband can be limited. Typically, a state in which a distance is shorter than a distance between communication devices used in broadcasting or general radio communication corresponds to the state of "being adjacent."

In the first communication device 20, a waveguide 23 that forms a transmission path to transmit a signal in the millimeter waveband, the signal being transmitted from the transmission unit 22, is provided between an output end of the transmission unit 22 and an inner surface of a resin plate (resin layer) 21A on a side of the second communication device 30. Similarly, in the second communication device 30, a waveguide 33 that forms a transmission path to transmit a received signal in the millimeter waveband is provided between an input end of the reception unit 32 and an inner surface of a resin plate (resin layer) 31A on a side of the first communication device 20 The waveguide 23 on the side of the first communication device 20 and the waveguide 33 on the side of the second communication device 30 are arranged in a state in which opening ends of the both are in contact with or adjacent to each other with a resin plate 21A and a resin plate 31A therebetween. In a state in which the planes of the housing 21 and the housing 31 are adjacent to each other, an air layer is interposed between the resin plate 21A and the resin plate 31A.

Examples of kinds of the waveguides include a hollow waveguide, a dielectric waveguide, and the like. Either a hollow waveguide or a dielectric waveguide can be used as each of the waveguide 23 on the side of the first communication device 20 and the waveguide 33 on the side of the second communication device 30. Here, a hollow waveguide, specifically, a rectangular waveguide having a rectangular cross-sectional shape is used. As the rectangular waveguide, a waveguide with a dimensional ratio of a long side and a short side of the cross section being 2:1 is preferable. The rectangular waveguide of 2:1 has an advantage that generation of a higher order mode is prevented and transmission can be performed efficiently. However, utilization of a waveguide, which has a cross-sectional shape other than a rectangle, such as a waveguide having a square or circular cross-sectional shape as each of the waveguides 23 and 33 is not eliminated. Furthermore, in a case of a thin waveguide, for example, in a case of a waveguide having a thickness of about 0.2 [mm], there is a case where a dimensional ratio of a long side and a short side is 10:1 or 15:1 although a transmission loss per a unit length is increased.

The waveguides 23 and 33 respectively include leakage prevention structures 24 and 34 to prevent leakage of a radio wave at peripheral parts of the opening ends. Since the waveguides 23 and 33 have the leakage prevention structures 24 and 34, it is possible to control the leakage of a radio wave to the outside of the waveguides 23 and 33 by an action of the leakage prevention structures 24 and 34. Here, it is assumed that the leakage prevention structures 24 and 34 are respectively provided in both of the waveguides 23 and 33. However, inclusion at least in the waveguide 23 on the transmission side is only necessary. Detailed configurations of the leakage prevention structures 24 and 34 will be described later.

The transmission unit 22 converts a signal to be transmitted into a signal in the millimeter waveband and performs processing of performing an output to the waveguide 23. The reception unit 32 receives the signal in the millimeter waveband, the signal being transmitted through the waveguide 33, and performs processing of restoring the original signal to be transmitted.

[Detailed Configuration of Transmission Unit and Reception Unit]

Figure 2B:
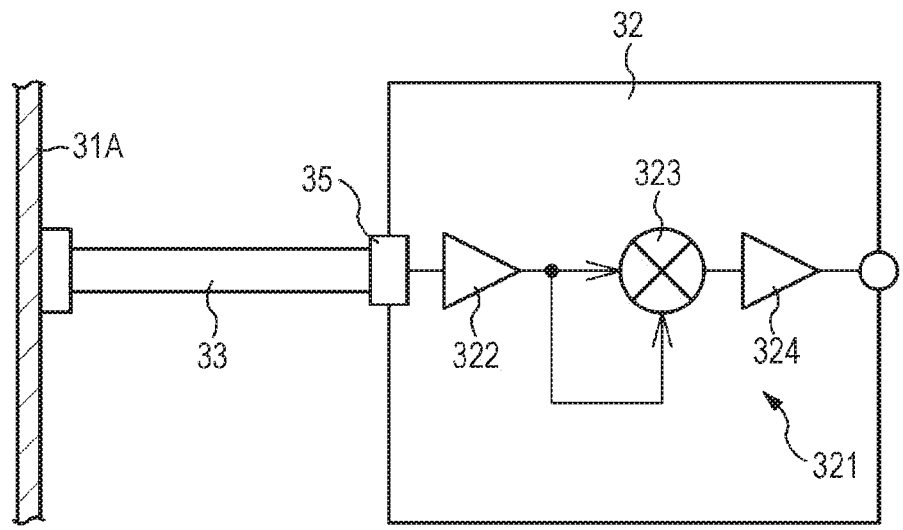
FIG. 2B is a block diagram illustrating an example of a detailed configuration of a reception unit.

Detailed configurations of the transmission unit 22 and the reception unit 32 will be described in the following. FIG. 2A is a view illustrating an example of a detailed configuration of the transmission unit 22, and FIG. 2B is a view illustrating an example of a detailed configuration of the reception unit 32.

The transmission unit 22 includes, for example, a signal generation unit 221 that processes a signal to be transmitted and generates a signal in the millimeter waveband. The signal generation unit 221 is a signal conversion unit that converts a signal to be transmitted into a signal in the millimeter waveband and includes, for example, an amplitude shift keying (ASK) modulation circuit. More specifically, the signal generation unit 221 generates an ASK-modulated wave in the millimeter waveband by multiplying with a multiplier 223 a signal in the millimeter waveband, the signal being given by an oscillator 222, and a signal to be transmitted, and performs an output through a buffer 224.

A connector device 25 is interposed between the transmission unit 22 and the waveguide 23. The connector device 25 couples the transmission unit 22 and the waveguide 23, for example, by capacitive coupling, electromagnetic induction coupling, electromagnetic field coupling, resonator coupling, or the like. The waveguide 23 is provided between the connector device 25 and the resin plate 21A in such a manner that an opening end surface thereof is in contact with the inner surface of the resin plate 21A, which forms a wall on the side of the second communication device 30, of the housing 21.

The reception unit 32 includes, for example, a signal restoration unit 321 that processes a signal in the millimeter waveband, the signal being given through the waveguide 33, and restores an original signal to be transmitted. The signal restoration unit 321 is a signal conversion unit that converts a received signal in the millimeter waveband into an original signal to be transmitted and includes, for example, a square detection circuit. More specifically, the signal restoration unit 321 performs conversion into an original signal to be transmitted by squaring, with a multiplier 323, a signal in the millimeter waveband (ASK modulation wave) given through a buffer 322 and performs an output through a buffer 324.

A connector device 35 is interposed between the waveguide 33 and the reception unit 32. The connector device 35 couples the waveguide 33 and the reception unit 32, for example, by capacitive coupling, electromagnetic induction coupling, electromagnetic field coupling, resonator coupling, or the like. The waveguide 33 is provided between the resin plate 31A and the connector device 35 in such a manner that an opening end surface thereof is in contact with the inner surface of the resin plate 31A, which forms a wall on the side of the first communication device 20, of the housing 31.

As described above, in the communication system 10 according to the present application example, a form of communication is millimeter wave communication in which communication is performed between the first communication device 20 and the second communication device 30 by utilization of a signal in the millimeter waveband as a radio-frequency signal in a state in which planes of the housing 21 and the housing 31 (both housing) are in contact with or adjacent to each other. In this communication system 10, dielectric plates, more specifically, resin plates 21A and 31A included in a part of the housings 21 and 31 are respectively provided on the opening end surfaces of the waveguides 23 and 33. Then, the waveguides 23 and 33 are included in a connector device that couples the first communication device 20 and the second communication device 30 via the dielectric plates in a state in which the opening ends are in contact with or adjacent to each other.

In the communication system 10 according to the present application example using the connector device having the above configuration, since the communication is performed in a state in which the opening ends of the two waveguides 23 and 33 are in contact with or adjacent to each other, transmission in a wide band compared to radio communication using a slot antenna is possible. Also, leakage of a radio wave to the outside of the waveguides 23 and 33 can be controlled. Specifically, since the waveguides 23 and 33 respectively include the leakage prevention structures 24 and 34 in the peripheral parts of the opening ends, it is possible to more securely control leakage of a radio wave to the outside of the waveguides 23 and 33 with the action of the leakage prevention structures 24 and 34. With this arrangement, it is possible to control deterioration of a transmission characteristic between the waveguide 23 and the waveguide 33 due to the leakage of a radio wave. Also, by the action of the leakage prevention structures 24 and 34, it is possible to control an input of an excess signal from the outside into the waveguides 23 and 33 such as an input of an interference wave in the millimeter waveband into the waveguides 23 and 33.

[Detailed Structure of Leakage Prevention Structure]

A detailed configuration of the leakage prevention structures 24 and 34 will be described. As each of the leakage prevention structures 24 and 34, a structure that causes a loss of a radio wave or a structure that reflects a radio wave can be used. An example of the leakage prevention structure that causes a loss of a radio wave includes, for example, a structure using a rubber-like elastic body. An example of the leakage prevention structure that reflects a radio wave includes, for example, a choke structure. A detailed configuration of the leakage prevention structure using the choke structure will be described in the following.

Figure 3:
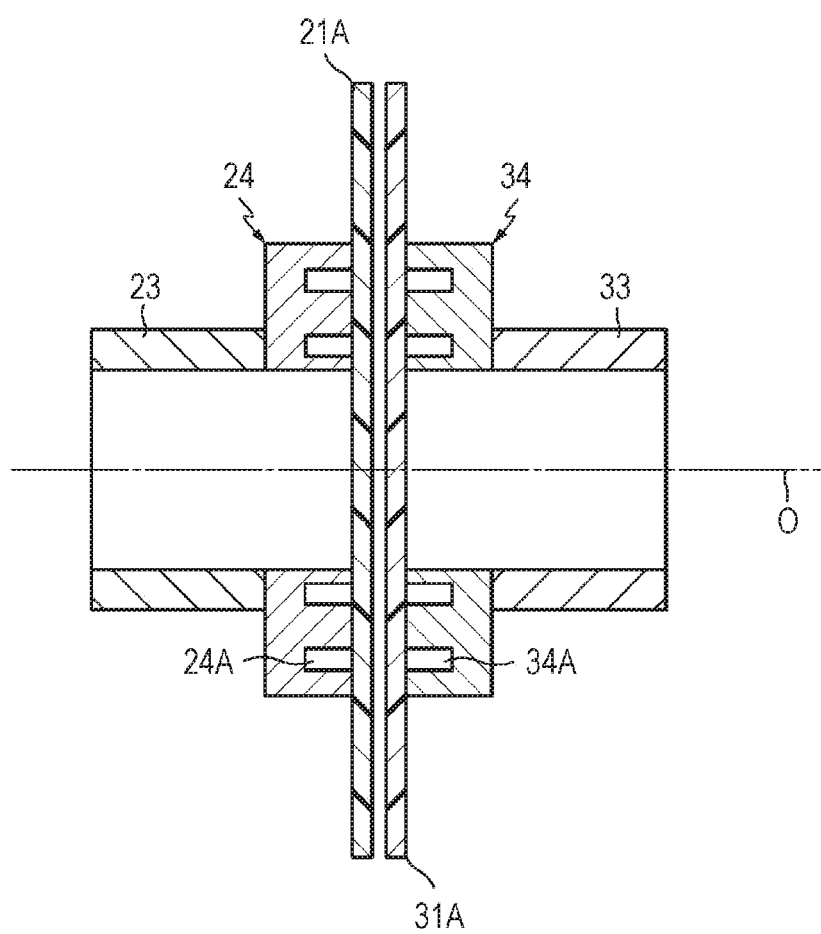
FIG. 3 is a cross-sectional view illustrating an example of a configuration of a connector device including a leakage prevention structure using a choke structure.

FIG. 3 is a cross-sectional view illustrating an example of a configuration of a connector device including a leakage prevention structure using a choke structure. As illustrated in FIG. 3, leakage prevention structures 24 and 34 in the choke structure having grooves 24A and 34A formed in an annular manner (such as rectangle-annular manner) around a center axis O of the waveguides 23 and 33 are provided in the peripheral parts of the opening ends of the waveguides 23 and 33. It is preferable that the depth of the grooves 24A and 34A of the choke structure is set to ¼ of a wavelength λ of a radio frequency (millimeter wave in this example) transmitted by the waveguides 23 and 33 (λ/4). The pitch of the grooves 24A and 34A is also preferably set to λ/4. Here, meaning of "λ/4" includes not only a case of strictly being λ/4 but also a case of substantially being λ/4, and existence of various kinds of variations generated by designing or manufacturing is permitted.

In the choke structure of the leakage prevention structures 24 and 34, in a case where the depth of the grooves 24A and 34A is λ/4, an incident wave and a reflected wave that is generated in the grooves 24A and 34A are in opposite phases in a steady state. Thus, since being canceled by the reflected wave generated in the grooves 24A and 34A, the incident wave does not advance to the outside of the choke structure. As a result, in the connector device to couple the waveguide 23 and the waveguide 33 via the resin plates 21A and 31A in a state in which the opening ends are in contact with or adjacent to each other, leakage of a radio wave to the outside can be controlled.

The leakage prevention structures 24 and 34 described here as an example are just an example and those having the above configuration are not the limitation. More specifically, in the above configuration, those with a configuration in which the number of stages of the grooves 24A and 34A is two are described as an example. However, two stages are not the limitation and one stage or multistage such as three stages or more may be employed. However, the greater the number of stages of the grooves 24A and 34A is, the greater the effect of controlling the leakage of a radio wave to the outside is.

Also, dielectric protrusion parts with the heights from the inner surfaces of the resin plates 21A and 31A being, for example, λ/2 may be respectively included at parts corresponding to center parts of the opening end surfaces of the waveguides 23 and 33 on inner surfaces of the resin plates 21A and 31A. Since the height of each of dielectric protrusions 25 and 35 from the inner surfaces of the resin plates 21A and 31A is λ/2, it is possible to form a resonator of λ/2 that only lets a radio wave in a resonant band among radio waves propagate through the waveguides 23 and 33. As a result, when a signal in the millimeter waveband is transmitted by the waveguides 23 and 33, it is possible to control reflection of a radio wave at contact surfaces of the opening end faces of the waveguides 23 and 33 and the resin plates 21A and 31A. Thus, deterioration of a transmission characteristic between the first communication device 20 and the second communication device 30, more specifically, a transmission characteristic between the waveguide 23 and the waveguide 33 due to reflection of a radio wave can be controlled.

Figure 4A:
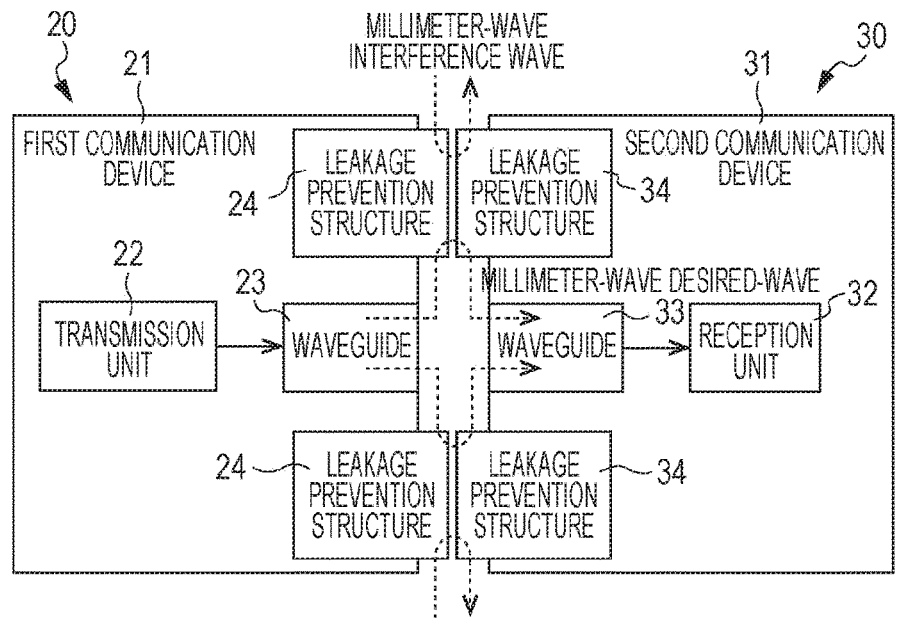
FIG. 4A is a block diagram illustrating a system configuration in a state in which a first communication device and a second communication device are adjacent to each other.

The action of the leakage prevention structures 24 and 34 will be described in more detail with reference to FIG. 4A. FIG. 4A is a block diagram illustrating a system configuration in a state in which the first communication device 20 and the second communication device 30 are adjacent to each other. The leakage prevention structures 24 and 34 prevent leakage of a radio wave in such a manner that a millimeter-wave desired-wave signal is not leaked to a space outside the waveguide 23 when the opening ends of the waveguides 23 and 33 come to be in contact with or adjacent to each other even in a case where dielectric plates (resin plate 21A and 31A) are interposed therebetween or a case where there is dirt or dust therebetween. Furthermore, the leakage prevention structures 24 and 34 prevent an interfering wave in the millimeter waveband outside the first communication device 20 and the second communication device 30 from entering the waveguides 23 and 33. With this arrangement, it is possible to securely block and transmit a radio wave in the waveguides 23 and 33 even in a case where there is a small gap between the waveguides 23 and 33 due to interposition of a dielectric plate, presence of dirt or dust, or the like.

Figure 4B:
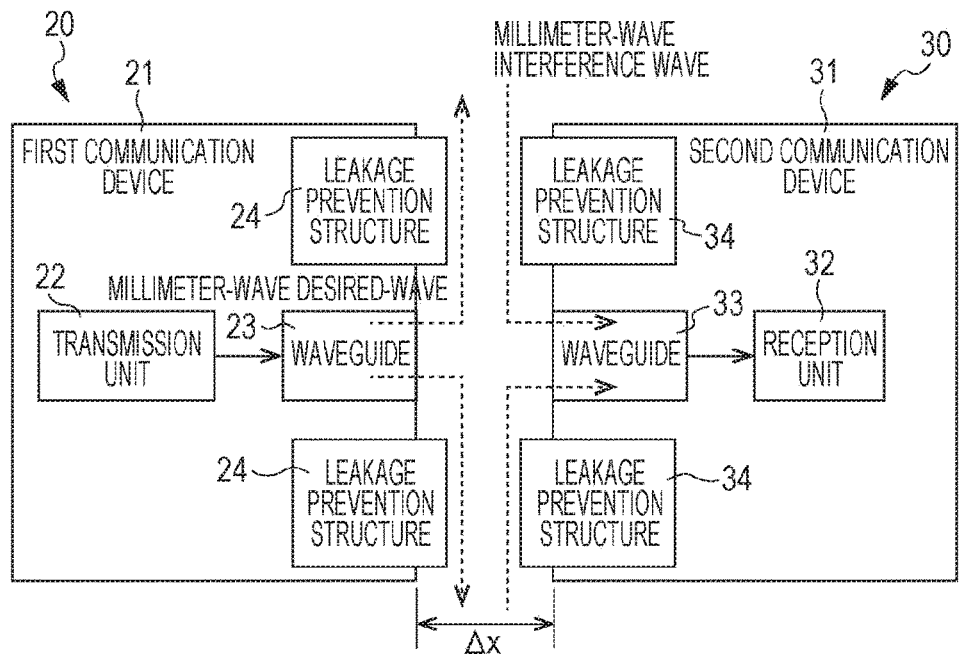
FIG. 4B is a block diagram illustrating a system configuration in a state in which the first communication device and the second communication device are apart from each other for a predetermined distance Δx or longer.

However, as illustrated in FIG. 4B, if a distance between the waveguide 23 of the first communication device 20 and the waveguide 33 of the second communication device 30 is a predetermined distance Δx or longer for some reason, there is a case where a radio wave transmitted by the waveguide 23 is leaked to a space outside the devices or an interference wave outside the devices enters the waveguide 33. Here, the predetermined distance Δx is a distance with which a situation in which a radio wave transmitted by the waveguide 23 is leaked to the space outside the devices without being blocked by the leakage prevention structures 24 and 34 or an interference wave outside the devices enters the waveguide 33 without being blocked by the leakage prevention structures 24 and 34 is actually generated. This distance Δx is defined according to the leakage prevention structures 24 and 34.

<First Embodiment>

Figure 5:
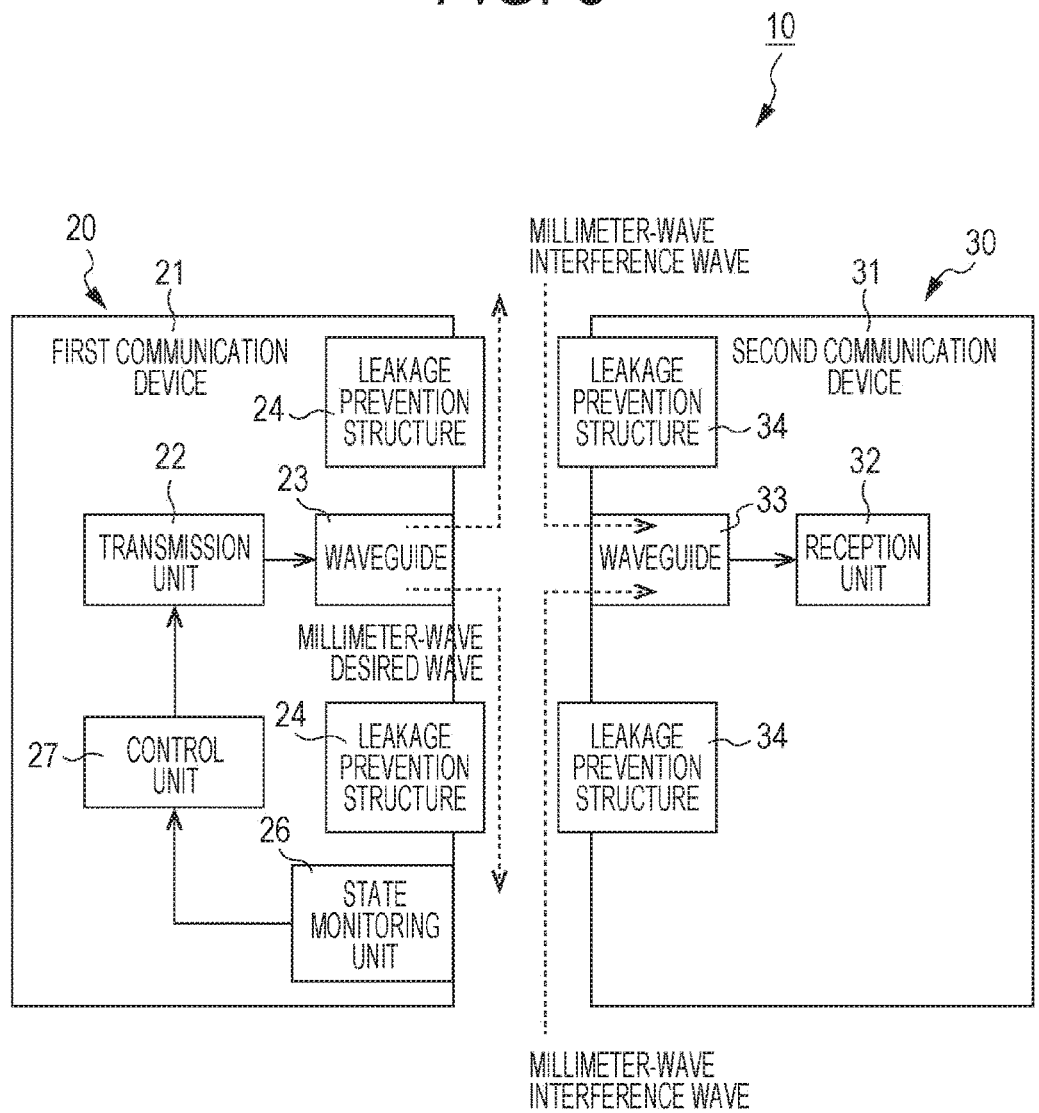
FIG. 5 is a block diagram illustrating an example of a system configuration of a communication system according to a first embodiment of the present disclosure.

FIG. 5 is a block diagram illustrating an example of a system configuration of a communication system according to a first embodiment of the present disclosure. As illustrated in FIG. 5, in a communication system 10 according to the present embodiment, a first communication device 20 on a transmission side includes a state monitoring unit 26 and a control unit 27 in addition to the transmission unit 22, the waveguide 23, and the leakage prevention structure 24 illustrated in FIG. 1. As the transmission unit 22, for example, a transmission unit having the configuration illustrated in FIG. 2A is used. Similarly to FIG. 1, a second communication device 30 on a reception side includes a reception unit 32, a waveguide 33, and a leakage prevention structure 34. As the reception unit 32, for example, a reception unit having the configuration illustrated in FIG. 2B is used.

In the first communication device 20 on the transmission side, the state monitoring unit 26 monitors a connection state of the waveguide 23 on the transmission side and the waveguide 33 on the reception side, more specifically, whether the connection state is a state in which radio wave leakage is generated at a connection part thereof. According to the connection state of the two waveguides 23 and 33, the state being monitored by the state monitoring unit 26, more specifically, in a case where the state monitoring unit 26 determines that the connection state of the waveguides 23 and 33 is a state in which radio wave leakage is generated at the connection part thereof, the control unit 27 performs control to stop a signal output of the transmission unit 22 in response to the determination result.

In such a manner, the connection state of the two waveguides 23 and 33 is monitored on the transmission side, and transmission of a radio-frequency signal (a signal in the millimeter waveband in this example) is stopped in a case where it is determined that the connection state is a state in which leakage of a radio wave is generated. Thus, the following action and effect can be acquired. That is, even if a distance between the waveguide 23 of the first communication device 20 and the waveguide 33 of the second communication device 30 is equal to or longer than a predetermined distance Δx (see FIG. 4B), a radio wave transmitted by the waveguide 23 (up to 3 THz) is not leaked to a space outside the devices (outside housing). With this arrangement, it is possible to control deterioration of a transmission characteristic due to leakage of a radio wave. Also, even if an interfering wave from the outside of the devices reaches the waveguide 33 without being blocked by the leakage prevention structures 24 and 34, it is possible to realize a connector device that has resistance to an interfering wave from the outside of the devices since a signal output of the transmission unit 22 is stopped.

Note that it is assumed that both the transmission side and the reception side respectively include the leakage prevention structures 24 and 34 in the first embodiment. However, this is not the limitation and inclusion at least on the transmission side is only necessary. Furthermore, even if the leakage prevention structure 24 is not included on the transmission side, it is possible to realize a connector device that can prevent leakage of a radio wave to the outside of the devices and that has resistance to an interference wave from the outside of the devices by the action of the state monitoring unit 26 and the control unit 27. This point is similar in a second embodiment described later.

A detailed example of the state monitoring unit 26 in the communication system 10 according to the first embodiment will be described in the following.

FIRST EXAMPLE

Figure 6:
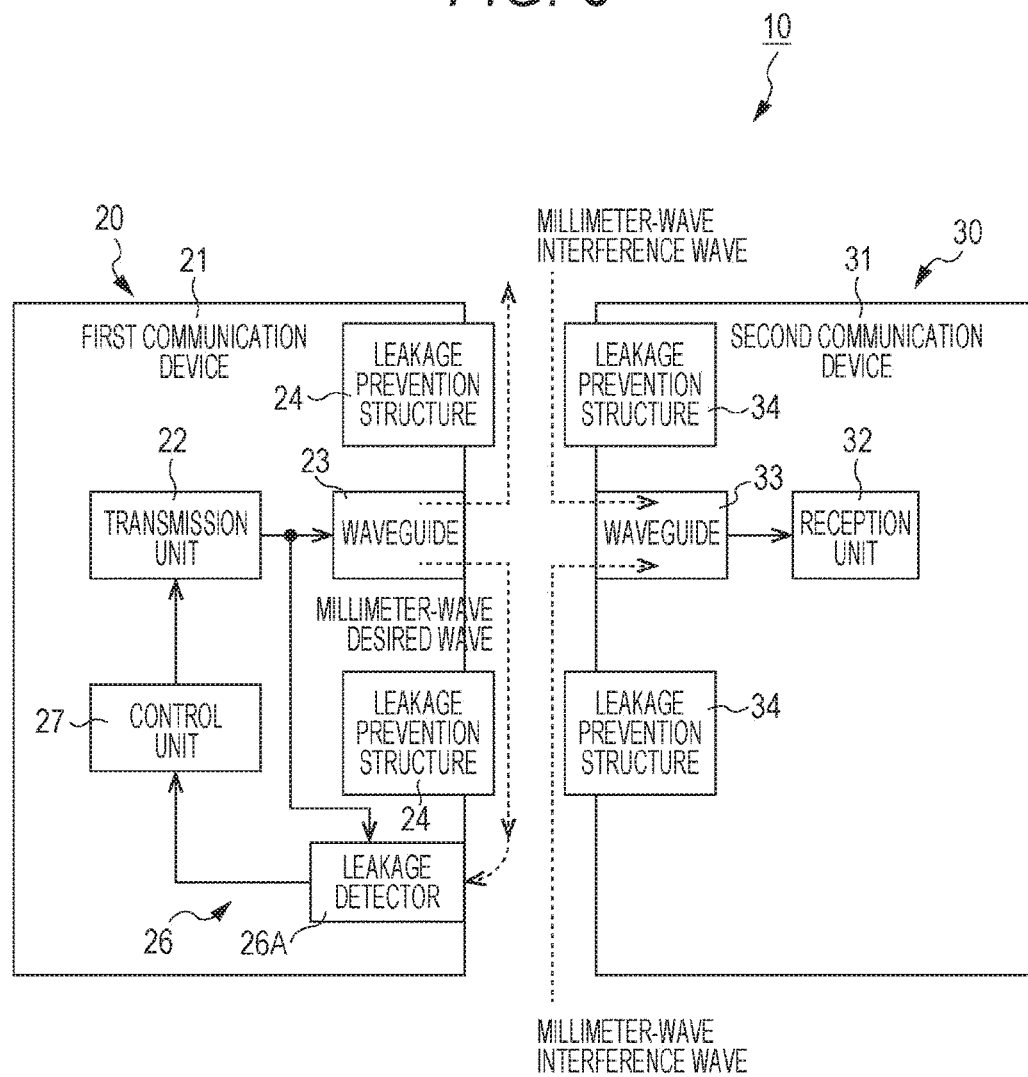
FIG. 6 is a block diagram illustrating an example of a system configuration of a communication system including a state monitoring unit according to a first example.

FIG. 6 is a block diagram illustrating an example of a system configuration of a communication system including a state monitoring unit 26 according to the first example. In FIG. 6, the state monitoring unit 26 according to the first example includes a leakage detector 26A provided in a first communication device 20 on a transmission side. The leakage detector 26A detects leakage of a radio wave from a correlation between a signal of a radio wave leaked at a connection part of two waveguides 23 and 33 and a signal of a millimeter-wave desired-wave output from a transmission unit 22. More specifically, for example, a pattern of a signal of a radio wave leaked at the connection part and a pattern of a signal of a millimeter-wave desired-wave are compared with each other. In a case where the two are the same patterns, it is detected that radio wave leakage is generated at the connection part of the two waveguides 23 and 33. With the detection result of the leakage detector 26A, the control unit 27 performs control to stop a signal output of the transmission unit 22.

According to the state monitoring unit 26 of the first example, that is, the leakage detector 26A, it is possible to detect whether a radio wave is actually leaked at the connection part of the two waveguides 23 and 33. Thus, on a side of the first communication device 20 on the transmission side, it is possible to quickly and securely detect leakage of a radio wave at the connection part of the two waveguides 23 and 33 and to prevent the radio wave leakage.

SECOND EXAMPLE

Figure 7:
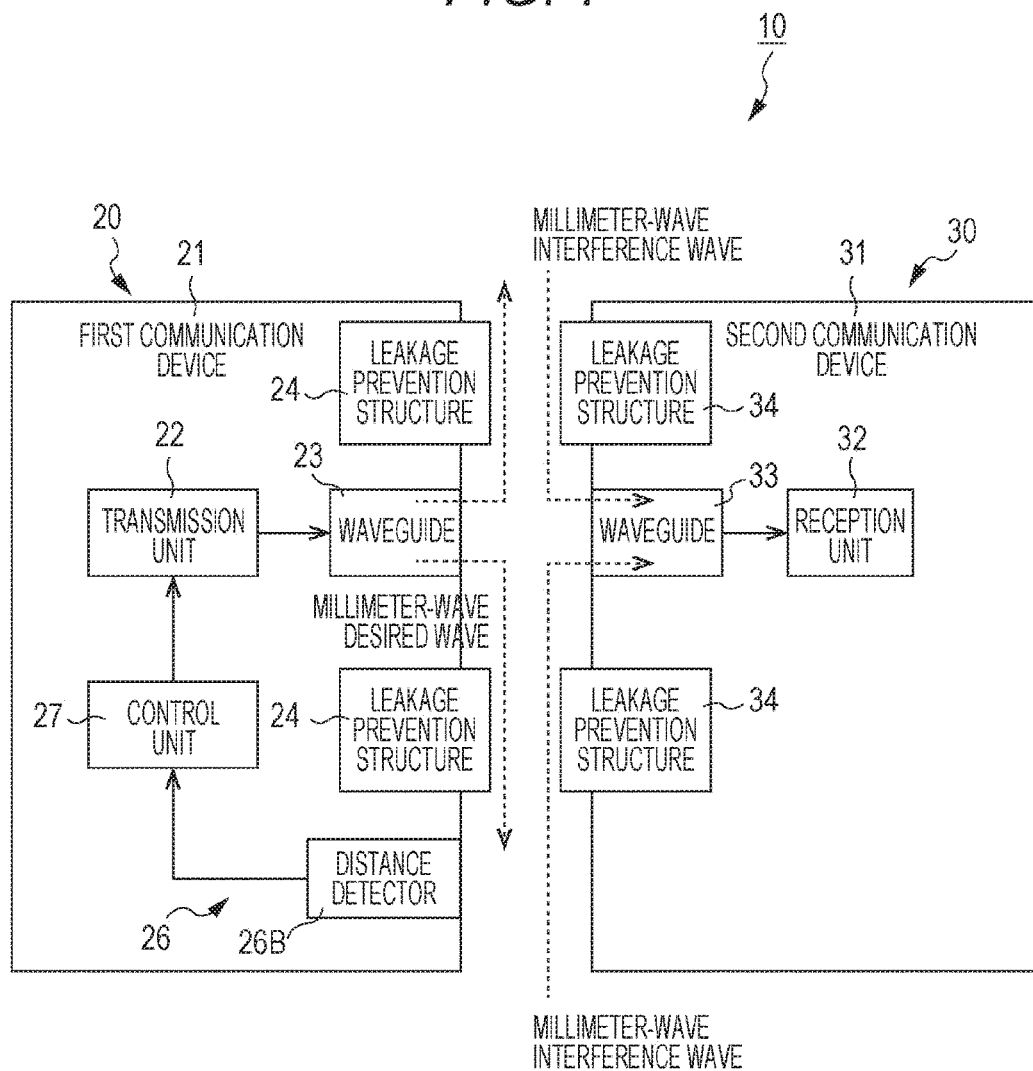
FIG. 7 is a block diagram illustrating an example of a system configuration of a communication system including a state monitoring unit according to a second example.

FIG. 7 is a block diagram illustrating an example of a system configuration of a communication system including a state monitoring unit 26 according to the second example. In the second example, it is focused that there is a correlation between leakage of a radio wave at a connection part of two waveguides 23 and 33 and a distance between the two waveguides 23 and 33. More specifically, as described with reference to FIG. 4B, if a distance between the waveguide 23 of a first communication device 20 and the waveguide 33 of a second communication device 30 is a predetermined distance Δx or longer, a phenomenon that a radio wave transmitted by the waveguide 23 is leaked to a space outside the devices or an interference wave outside the devices enters the waveguide 33 is generated.

A state monitoring unit 26 according to the second example includes a distance detector 26B that is provided in the first communication device 20 on a transmission side and that detects a distance between the first communication device 20 and the second communication device 30 from the above-described correlation between leakage of a radio wave and a distance. The distance detector 26B detects that a distance between the waveguide 23 and the waveguide 33 exceeds a predetermined distance Δx (see FIG. 4B) defined according to the leakage prevention structures 24 and 34. With the detection result of the distance detector 26B, a control unit 27 performs control to stop a signal output of a transmission unit 22.

As a distance detection method of the distance detector 26B, a known detection method can be used. For example, there are a capacitive-type detection method of performing detection on the basis of a change in electrical capacitance between a detection object (second communication device 30 in this example) and the distance detector 26B, a magnetic-type detection method of performing detection by utilization of an eddy current generated in a metal body arranged in a detection object, and the like as examples. In addition to the capacitive type and the magnetic type, inductance-type, ultrasonic-type, sonic/vibration-type, and optical-type detection methods can be used. For example, as the optical-type detection method, a triangulation method of converting, into a distance, an image forming position of a light receiving element such as a CMOS according to a distance change, a time-of-flight method of measuring time from emission of light to a detection object until reception of light reflected on the detection object and performing conversion into a distance, and the like are known.

In a case of the leakage detector 26A according to the first example, radio-frequency designing is necessary to detect a high frequency such as a millimeter waveband. On the other hand, in a case of the distance detector 26B according to the second example, it is not necessary to detect a high frequency such as a millimeter waveband, and it is possible to detect a predetermined distance Δx, at which radio wave leakage is generated, by a simple known distance detection method. With this arrangement, a connection state at the connection part of the two waveguides 23 and 33 in which state radio wave leakage is generated is quickly and securely detected on a side of the first communication device 20 on the transmission side and to securely prevent the radio wave leakage.

<Second Embodiment>

Figure 8:
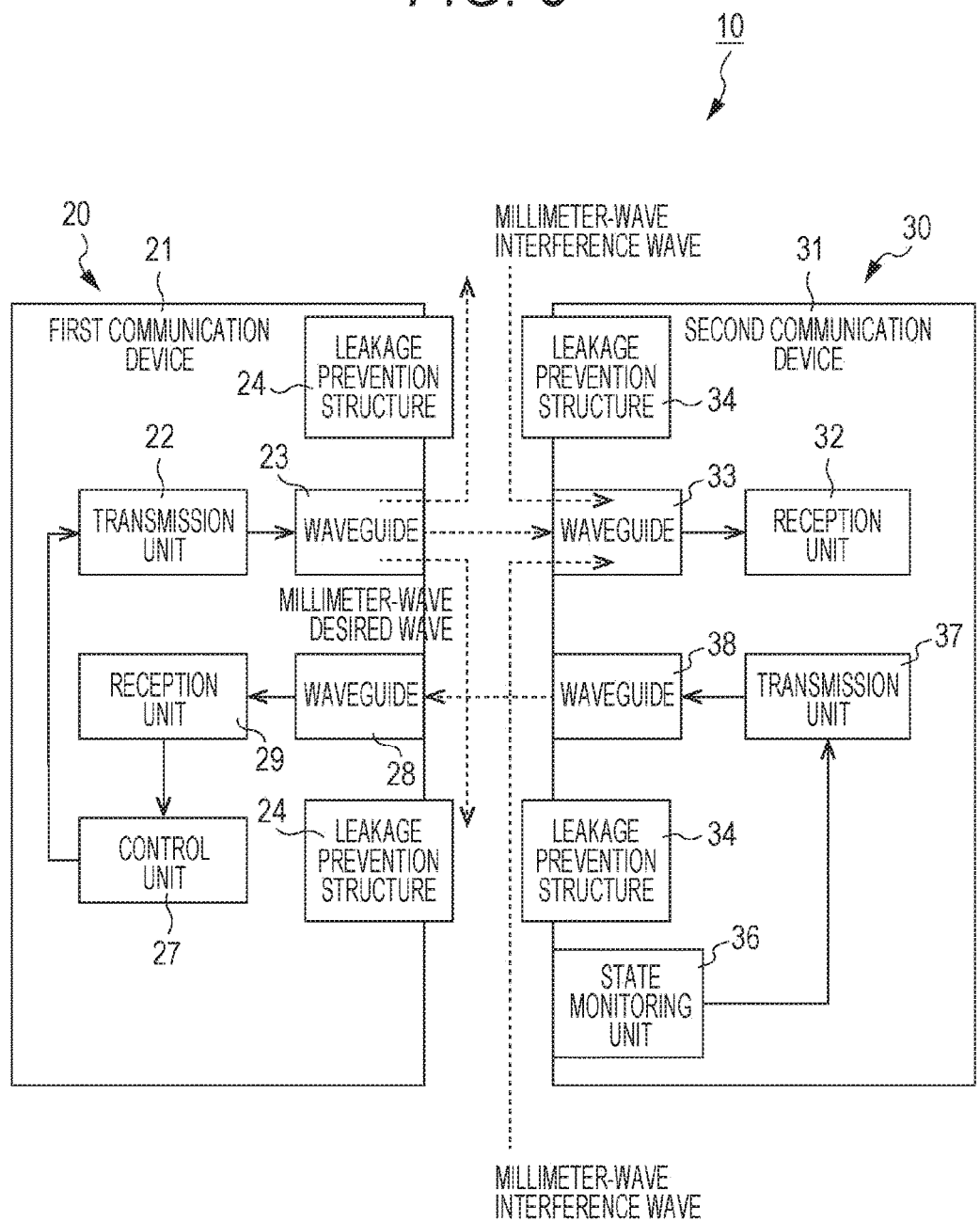
FIG. 8 is a block diagram illustrating an example of a system configuration of a communication system according to a second embodiment of the present disclosure.

FIG. 8 is a block diagram illustrating an example of a system configuration of a communication system according to the second embodiment of the present disclosure. In the communication system according to the first embodiment, the state monitoring unit 26 is provided in the first communication device 20 on the transmission side. On the other hand, in a communication system according to the second embodiment, a state monitoring unit 36 is provided in a second communication device 30 on a reception side. Similarly to the first embodiment, as the state monitoring unit 36, the leakage detector 26A according to the first example can be used or the distance detector 26B according to the second example can be used.

As illustrated in FIG. 8, in addition to a reception unit 32, a waveguide 33, and a leakage prevention structure 34, the second communication device 30 on the reception side includes a state monitoring unit 36, a transmission unit 37, and a waveguide 38. Similarly to the state monitoring unit 26, the state monitoring unit 36 monitors a connection state of a waveguide 23 on a transmission side and the waveguide 33 on the reception side, more specifically, whether the connection state of the two waveguides 23 and 33 is a state in which radio wave leakage is generated at a connection part thereof. Then, in a case of determining that the radio wave leakage is generated in the state, the state monitoring unit 36 outputs a radio wave leakage detection signal to the transmission unit 37.

Basically, the transmission unit 37 has a configuration similar to that of a transmission unit 22 on a side of a first communication device 20. When a radio wave leakage detection signal is supplied from the state monitoring unit 36, the radio wave leakage detection signal is converted into a radio-frequency signal such as a signal in a millimeter waveband and is output to the waveguide 38 as a return control signal in the millimeter waveband. The waveguide 38 transmits the return control signal in the millimeter waveband, the signal being output from the transmission unit 37, to the side of the first communication device 20.

The first communication device 20 on the transmission side includes a waveguide 28 and a reception unit 29 in addition to the transmission unit 22, the waveguide 23, a leakage prevention structure 24, and a control unit 27. The waveguide 28 receives a return control signal in the millimeter waveband, the signal being transmitted by the waveguide 38 on the side of the second communication device 30, and performs transmission to the reception unit 29. Basically, the reception unit 29 has a configuration similar to that of the reception unit 32 on the side of the second communication device 30. A return control signal in the millimeter waveband, the signal being transmitted by the waveguide 28, is processed and an original radio wave leakage detection signal is restored and supplied to the control unit 27. The control unit 27 performs control to stop a signal output of the transmission unit 22 in response to the radio wave leakage detection signal.

In the above-described communication system according to the second embodiment, an action and an effect similar to those of the communication system according to the first embodiment can be acquired. That is, even if a distance between the waveguide 23 of the first communication device 20 and the waveguide 33 of the second communication device 30 is equal to or longer than a predetermined distance Δx (see FIG. 4B), a radio wave transmitted by the waveguide 23 (up to 3 THz) is not leaked to a space outside the devices (outside housing). With this arrangement, it is possible to control deterioration of a transmission characteristic due to leakage of a radio wave. Also, even if an interfering wave from the outside of the devices reaches the waveguide 33 without being blocked by the leakage prevention structures 24 and 34, it is possible to realize a connector device that has resistance to an interfering wave from the outside of the devices since a signal output of the transmission unit 22 is stopped.

Incidentally, the present disclosure may have the following configuration.

[1] A connector device including: two waveguides configured to transmit a radio-frequency signal; a state monitoring unit configured to monitor a connection state of the two waveguides; and a control unit that is provided on a side of the waveguide, which is on a transmission side to transmit a radio-frequency signal, between the two waveguides and that stops transmission of the radio-frequency signal according to the connection state of the two waveguides, the state being monitored by the state monitoring unit.

[2] The connector device according to [1], in which the state monitoring unit is provided on the side of the waveguide on the transmission side.

[3] The connector device according to [1] or [2], in which the state monitoring unit monitors whether the connection state of the two waveguides is a state in which radio wave leakage is generated at a connection part thereof.

[4] The connector device according to any one of [1] to [3], in which in a case where the connection state of the two waveguides is a state in which opening ends of the two waveguides are in contact with or adjacent to each other, a leakage prevention structure to prevent leakage of a radio wave from a connection part is provided at least on the side of the waveguide on the transmission side.

[5] The connector device according to [4], in which the leakage prevention structure has a choke structure provided at least in a peripheral part of the opening end of the waveguide on the transmission side.

[6] The connector device according to [5], in which a depth of a groove of the choke structure is ¼ of a wavelength of a radio frequency transmitted between the two waveguides.

[7] The connector device according to any one of [1] to [6], in which the state monitoring unit includes a leakage detector configured to detect leakage of a radio wave from a correlation between a signal of a radio wave leaked at a connection part of the two waveguides and a signal transmitted between the two waveguides.

[8] The connector device according to any one of [1] to [6], in which the state monitoring unit includes a distance detector configured to detect that a distance between the two waveguides exceeds a predetermined distance.

[9] The connector device according to [1], in which the state monitoring unit is provided on a side of the waveguide, which is on a reception side to receive a radio-frequency signal, and transmits a return control signal corresponding to a monitoring result to the control unit on the transmission side.

[10] The connector device according to [9], in which the return control signal is a radio-frequency signal.

[11] The connector device according to any one of [1] to [10], in which the radio-frequency signal is a signal in a millimeter waveband.

[12] A communication device including: a connector device configured to transmit a radio-frequency signal to a different communication device including a waveguide, in which the connector device includes a waveguide configured to transmit a radio-frequency signal to the waveguide of the different communication device, a state monitoring unit configured to monitor a connection state of the two waveguides between itself and the different communication device, and a control unit configured to stop transmission of the radio-frequency signal according to the connection state of the two waveguides, the state being monitored by the state monitoring unit.

[13] The communication device according to [12], in which the radio-frequency signal is a signal in a millimeter waveband.

[14] A communication system including: two communication devices; and a connector device configured to transmit a radio-frequency signal between the two communication devices, in which the connector device includes two waveguides respectively provided in the two communication devices, a state monitoring unit configured to monitor a connection state of the two waveguides, and a control unit that is provided on a side of the waveguide, which is on a transmission side to transmit a radio-frequency signal, between the two waveguides and that stops transmission of the radio-frequency signal according to the connection state of the two waveguides, the state being monitored by the state monitoring unit.

[15] The communication system according to [14], in which the radio-frequency signal is a signal in a millimeter waveband.

REFERENCE SIGNS LIST

10 Communication system
20 First communication device
30 Second communication device
21, 31 Housing
21A, 31A Resin plate (dielectric plate)
22, 37 Transmission unit
23, 33, 28, 38 Waveguide
24, 34 Leakage prevention structure
25, 35 Connector device
26, 36 State monitoring unit
26A Leakage detector
26B Distance detector
27 Control unit
29, 32 Reception unit
221 Signal generation unit (signal conversion unit)
222 Oscillator
223, 323 Multiplier
224, 322, 324 Buffer
321 Signal restoration unit (signal conversion unit)

The invention claimed is:

1. A connector device, comprising:
a first waveguide configured to transmit a first radio-frequency signal, wherein the first waveguide is on a transmission side of the connector device;
a second waveguide configured to receive the first radio-frequency signal;
a state monitoring unit configured to monitor a connection state of the first waveguide and the second waveguide,
wherein the state monitoring unit comprises a leakage detector configured to detect leakage of a radio wave from a connection part of the first waveguide and the second waveguide, the leakage of the radio wave is detected based on a correlation between a signal of the radio wave leaked from the connection part and the first radio-frequency signal transmitted by the first waveguide; and
a control unit is on the transmission side,
wherein the control unit is configured to stop transmission of the first radio-frequency signal based on the connection state of the first waveguide and the second waveguide monitored by the state monitoring unit.

2. The connector device according to claim 1, wherein the state monitoring unit is on the transmission side of the connector device.

3. The connector device according to claim 1, wherein the state monitoring unit is further configured to:
monitor whether the connection state of the first waveguide and the second waveguide is a state in which the leakage of the radio wave is detected from the connection part of the first waveguide and the second waveguide.

4. The connector device according to claim 1, further comprising a leakage prevention structure configured to prevent the leakage of the radio wave from the connection part of the first waveguide and the second waveguide,
wherein an opening end of each of the first waveguide and the second waveguide are in contact with or adjacent to each other and the, leakage prevention structure is on the transmission side.

5. The connector device according to claim 4, wherein the leakage prevention structure comprises a choke structure in at least a peripheral part of the opening end of the first waveguide on the transmission side.

6. The connector device according to claim 5, wherein a depth of a groove of the choke structure is ¼ of a wavelength of the first radio-frequency transmitted between the first wavequide and the second wavequide.

7. The connector device according to claim 1, wherein the first radio-frequency signal is in a millimeter waveband.

8. The connector device according to claim 1, wherein the state monitoring unit further includes a distance detector configured to detect that a distance between the first wavequide and the second waveguide exceeds a determined distance.

9. The connector device according to claim 1, wherein
the state monitoring unit is on a side of the second waveguide, which is on a reception side of the connector device, and
the state monitoring unit is further configured to:
receive the first radio-frequency signal; and
transmit a return control signal corresponding to a result of the monitoring to the control unit on the transmission side of the connector device.

10. The connector device according to claim 9, wherein the return control signal is a second radio-frequency signal.

11. A connector device, comprising:
a first waveguide configured to transmit a first radio-frequency signal, wherein the first waveguide is on a transmission side of the connector device;
a second waveguide configured to receive the first radio-frequency signal, wherein the second waveguide is on a reception side of the connector device;
a state monitoring unit on the reception side of the connector device, wherein
the state monitoring unit is configured to:
monitor a connection state of the first waveguide and the second waveguide;
receive the first radio-frequency signal; and
transmit a return control signal corresponding to a result of the monitoring,
wherein the return control signal is a second radio-frequency signal; and a control unit on the transmission side of the connector device, wherein the control unit is configured to:
stop transmission of the first radio-frequency signal based on the connection state of the first waveguide and the second waveguide; and
receive the return control signal from the state monitoring unit.

12. A first communication device, comprising:
a connector device configured to transmit a radio-frequency signal to a second communication device, wherein the connector device includes:
a first waveguide configured to transmit the radio-frequency signal to a second waveguide of the second communication device;
a state monitoring unit configured to monitor a connection state of the first waveguide and the second wavequide,
wherein the state monitoring unit comprises a leakage detector configured to detect leakage of a radio wave from a connection part of the first wavequide and the second wavequide, the leakage of the radio wave is detected based on a correlation between a signal of the radio wave leaked from the connection part and the radio-frequency signal transmitted by the first wavequide; and
a control unit configured to stop transmission of the radio-frequency signal based on the connection state of the first wavequide and the second wavequide monitored by the state monitoring unit.

13. The first communication device according to claim 12, wherein the radio-frequency signal is in a millimeter waveband.

14. A communication system, comprising:
a first communication device;
a second communication device; and
a connector device configured to transmit a radio-frequency signal between the first communication device and the second communication device,
wherein the connector device includes:
a first waveguide in the first communication device;
a second waveguide in the second communication device;
a state monitoring unit configured to monitor a connection state of the first waveguide and the second wavequide,
wherein the state monitoring unit comprises a leakage detector configured to detect leakage of a radio wave from a connection part of the first waveguide and the second waveguide, the leakage of the radio wave is detected based on a correlation between a signal of the radio wave leaked from the connection part and the radio-frequency signal transmitted by the first wavequide; and
a control unit on a transmission side of the connector device that transmits the radio-frequency signal,
wherein the control unit is configured to stop transmission of the radio-frequency signal based on the connection state of the first waveguide and the second waveguide monitored by the state monitoring unit.

15. The communication system according to claim 14, wherein the radio-frequency signal is in a millimeter waveband.

* * * * *